US009553339B2

(12) United States Patent
Stimm et al.

(10) Patent No.: US 9,553,339 B2
(45) Date of Patent: Jan. 24, 2017

(54) SECURITY ARCHITECTURE, BATTERY AND MOTOR VEHICLE HAVING A CORRESPONDING BATTERY

(75) Inventors: Frank Stimm, Stuttgart (DE); Andreas Heyl, Ludwigsburg (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 455 days.

(21) Appl. No.: 14/122,608

(22) PCT Filed: May 14, 2012

(86) PCT No.: PCT/EP2012/058850
§ 371 (c)(1),
(2), (4) Date: Feb. 7, 2014

(87) PCT Pub. No.: WO2012/163656
PCT Pub. Date: Dec. 6, 2012

(65) Prior Publication Data
US 2014/0175874 A1    Jun. 26, 2014

(30) Foreign Application Priority Data
May 31, 2011   (DE) .................. 10 2011 076 757

(51) Int. Cl.
*H02H 7/18*    (2006.01)
*H01M 10/42*   (2006.01)
(Continued)

(52) U.S. Cl.
CPC .......... *H01M 10/425* (2013.01); *B60L 3/0046* (2013.01); *B60L 3/0092* (2013.01);
(Continued)

(58) Field of Classification Search
USPC ............................................ 307/10.7, 64–66
See application file for complete search history.

(56) References Cited

U.S. PATENT DOCUMENTS

2005/0052221 A1   3/2005   Kohnotoh et al.
2007/0170889 A1   7/2007   Ishikawa et al.

FOREIGN PATENT DOCUMENTS

DE   10 2009 003 048 A1   11/2010
GB         2463145 A        3/2010
WO       2010074290 A1      7/2010

OTHER PUBLICATIONS

International Search Report corresponding to PCT Application No. PCT/EP2012/058850, mailed Sep. 6, 2012 (German and English language document) (7 pages).

*Primary Examiner* — Rexford Barnie
*Assistant Examiner* — Dru Parries
(74) *Attorney, Agent, or Firm* — Maginot, Moore & Beck LLP

(57) ABSTRACT

A security architecture, a battery, and a motor vehicle that has a corresponding battery are configured to be used to combine battery packs of a lower security integrity level into a battery system that has a higher security integrity level. The security architecture is for at least two batteries and each battery includes at least one electrochemical cell. The at least two batteries are each combined with at least one data processing unit to form a respective module. The security architecture is configured such that input signals of at least one second module are processed by the at least one data processing unit of at least one first module.

3 Claims, 2 Drawing Sheets

(51) Int. Cl.
*H01M 10/44* (2006.01)
*H01M 10/48* (2006.01)
*H04Q 9/00* (2006.01)
*B60L 3/00* (2006.01)
*B60L 11/18* (2006.01)

(52) U.S. Cl.
CPC ....... *B60L 11/1851* (2013.01); *B60L 11/1864* (2013.01); *H01M 10/44* (2013.01); *H01M 10/441* (2013.01); *H01M 10/443* (2013.01); *H01M 10/48* (2013.01); *H01M 10/482* (2013.01); *H01M 10/486* (2013.01); *H04Q 9/00* (2013.01); *B60L 2240/545* (2013.01); *B60L 2240/547* (2013.01); *H04Q 2209/10* (2013.01); *H04Q 2209/30* (2013.01); *Y02T 10/7005* (2013.01); *Y02T 10/7011* (2013.01); *Y02T 10/7061* (2013.01); *Y10T 307/549* (2015.04)

SECURITY ARCHITECTURE, BATTERY AND MOTOR VEHICLE HAVING A CORRESPONDING BATTERY

This application is a 35 U.S.C. §371 National Stage Application of PCT/EP2012/058850, filed on May 14, 2012, which claims the benefit of priority to Serial No. DE 10 2011 076 757.6, filed on May 31, 2011 in Germany, the disclosures of which are incorporated herein by reference in their entirety.

BACKGROUND

The present disclosure relates to a safety architecture, a battery and a motor vehicle having a corresponding battery that are able to be used particularly in order to combine battery packs of a relatively low safety integrity level to form a battery system having a relatively high safety integrity level.

For the supply of power to electric drives in electric and hybrid vehicles, high-voltage lithium ion batteries are frequently used. The chemistry in these batteries means that they have a hazard potential. By way of example, if operating limits are exceeded then a battery fire or leakage of dangerous chemical substances may occur.

Examples of safety-relevant operating limits are:
upper threshold for the charge (voltage) of a battery cell,
lower threshold for the charge (voltage) of a battery cell,
upper threshold for the temperature of a battery cell,
upper threshold for the charging current of a battery (temperature dependent).

The charging and discharging of a battery are regulated by a battery management system (BMS) such that safety is assured under given requirements. For this, the sensor means, the logic and the actuator means need to be designed in line with the safety requirements or the safety integrity level (ASIL [Automotive Safety Integrity Level] from ISO 26262). Exceeding of the operating limits is usually monitored by monitoring functions, e.g. in the central logic.

Hybrid vehicles frequently require only relatively small batteries. The lower energy content means that these sometimes comply only with a low ASIL B.

By contrast, batteries for electric vehicles have to comply with a relatively high ASIL C or D on account of their higher hazard potential. This often has great repercussions on the software processes and the hardware structure. This is disadvantageous particularly because it means that different battery systems have conventionally had to be used on the basis of the safety requirements.

SUMMARY

The disclosure therefore provides a safety architecture for at least two batteries, wherein the safety architecture allows changeover between an ASIL-B mode and an ASIL-C or ASIL-D mode. The batteries each comprise at least one electrochemical cell. Furthermore, at least some of the batteries are combined with at least one data processing unit, e.g. a logic unit. The at least one data processing unit and the battery combined therewith form a module. The data processing unit is preferably part of a BMS.

According to the disclosure, the safety architecture is set up such that the at least one data processing unit of at least one first module processes input signals for at least one second module. A particular advantage of such a safety architecture is that the input signals can be monitored on a redundant basis, even if the individual modules comply with just a low safety requirement, such as ASIL B. Preferably, it is possible to change over between different safety requirements in a battery system having at least two modules.

It is found to be advantageous if the input signals for the at least one second module are provided for the at least one first module via a bus from a sensor of the at least one second module or via a CAN connection (CAN=Controller Area Network) between the at least one first and second modules.

In one preferred embodiment of the disclosure, a shutdown path, particularly an actuator means, for one module can be activated by output signals from another module. The effect advantageously achieved by this is that the actuator means is of sufficiently redundant design.

In another preferred embodiment of the disclosure, the input signals are evaluated by redundant data processing units. A particular advantage of this embodiment is that a high ASIL is assured for the safety functions, for example for the monitoring of threshold values.

A further preferred embodiment provides for the safety architecture to be set up such that one module receives input signals from all other modules and evaluates them on a redundant basis. The effect advantageously achieved with this refinement is that the safety architecture is designed as a master/slave architecture. In this context, it is found to be advantageous if a module is used as a master module. In one preferred embodiment, the master module receives the sensor signals from all other modules (slave modules). The particular advantage of a master/slave architecture is particularly that the input signals are evaluated by redundant data processing units.

Yet another preferred embodiment provides for the transmission of the input signals from the at least one second module to the at least one first module to involve a data processing unit of the at least one second module acting as a "gateway". It is found to be advantageous if suitable measures ensure that the input signals cannot be manipulated or cannot be manipulated undetected.

It is also found to be advantageous if a current value from a first module is plausibilized by using a current value from the current sensor of at least one second module as a redundancy value. This means that, even with a relatively high safety requirement, it is not necessary for the modules to be equipped with a plurality of current sensors in order to achieve the prescribed redundancy. With a low safety requirement, the current sensor is preferably plausibilized individually, and for a higher safety requirement a current value from the at least one second module is used as a redundancy value.

A further preferred embodiment provides for the safety architecture to be set up such that the at least one second module transmits minimum and/or maximum values from sensors as plausibility values. Preferably, this is implemented by an additional logic chip in the sensor logic of the at least one second module. The minimum and/or maximum values are evaluated as plausibility values in this embodiment.

In yet another preferred embodiment, at least some of the sensors in at least some of the modules exist on a redundant basis and a signal path for a sensor is evaluated by a first module and a signal path for a redundantly existent sensor is evaluated by a second module. In this context, it is found to be advantageous that the signals from the sensors that are existent on a redundant basis in a first module are evaluated by two different modules.

Another preferred embodiment provides for each module to comprise precisely one actuator means and for the redundancy of the actuator means to be achieved by virtue of the actuator means of the at least one second module being able to be controlled by output signals from the at least one first module. This is advantageous particularly because the combination of the actuator means of the at least one first and second modules achieves the required redundancy without each individual module needing to be equipped with a redundant actuator means.

A further aspect of the disclosure relates to a battery that is combined with a safety architecture, wherein the safety architecture is set up such that the at least one data processing unit of at least one first module processes input signals for at least one second module. Preferably, the battery is a lithium ion battery or the battery comprises electrochemical cells that are in the form of lithium ion battery cells.

Another aspect of the disclosure relates to a motor vehicle having an electric drive motor for driving the motor vehicle and a battery based on the aspect of the disclosure that is described in the preceding paragraph that is connected or can be connected to the electric drive motor. The battery is not restricted to such a purpose of use, however, but rather can also be used in other electrical systems.

The disclosure provides an extension to the safety architecture in which two or more battery packs, that is to say batteries with BMS, having a low safety requirement, such as ASIL B, are combined to form a battery system having a relatively high safety requirement, such as ASIL C or D. In particular, this has the advantage that the same modules can be used to design systems having a different ASIL without having to vary the architecture of the basic modules for each ASIL.

Advantageous developments of the disclosure are specified in the subclaims and are described in the description.

BRIEF DESCRIPTION OF THE DRAWINGS

Exemplary embodiments of the disclosure are explained in more detail with reference to the drawings and the description below. In the drawings.

DETAILED DESCRIPTION

The disclosure will be described in greater detail below with reference to basic modules that comply with safety integrity level ASIL B. The exemplary embodiment describes the disclosure with reference to an exemplary combination 200 of two ASIL-B modules to form an ASIL-C or ASIL-D module. In this case, the disclosure is not restricted to this specific safety requirement.

Figure 1:
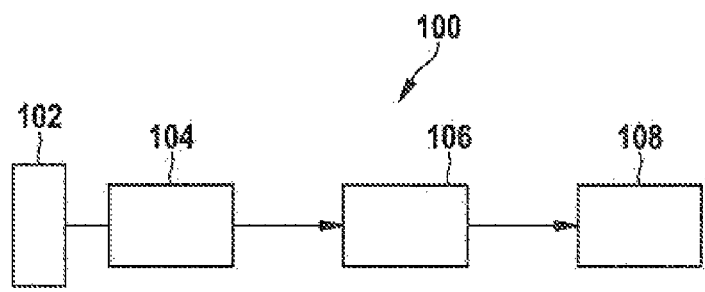
FIG. 1 shows a safety chain for a battery.

It is subsequently presupposed that a safety chain 100 having hardware and software exists, comprising at least electrochemical cells 102, at least one sensor 104, at least one logic unit 106 and at least one actuator 108, wherein the safety chain 100 complies with ASIL-B (cf. FIG. 1).

The software safety architecture of the exemplary embodiment allows changeover between the ASIL-B mode and the ASIL-C or ASIL-D mode. In the case of the higher ASIL mode, the first basic module 202 additionally needs to process or monitor the input signals for the second basic module 204. In addition, it is advantageous if the shutdown path for the second basic module 204 can be activated by means of the actuator means thereof via outputs of the first basic module 202.

Figure 2:
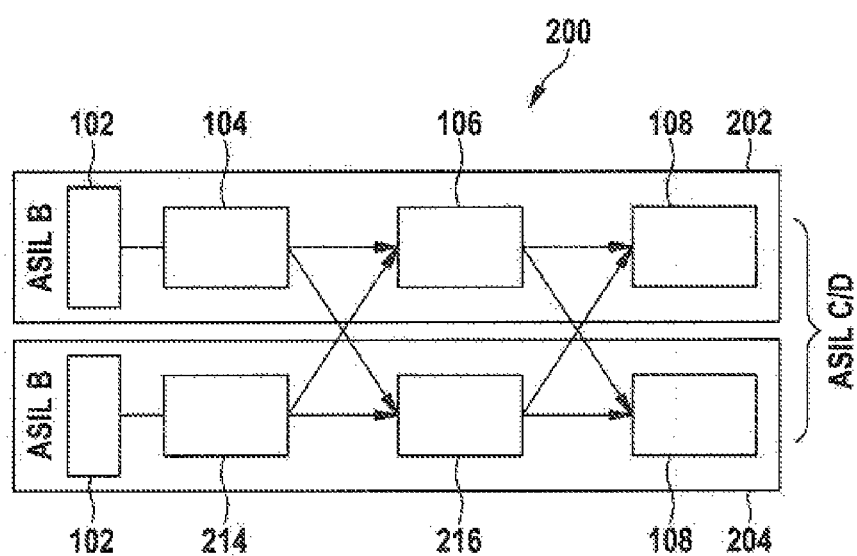
FIG. 2 shows an illustration of an exemplary combination of two ASIL-B modules to form an ASIL-C or ASIL-D module.

FIG. 2 reproduces an illustration of an exemplary combination of two ASIL-B modules to form an ASIL-C or ASIL-D module. The first basic module 202 needs to be able to read in the sensor signals from the second basic module 204. This can be done either via a second bus from the sensor 214 of the second basic module 204 or, by way of example, via the CAN connection between the two basic modules 202, 204, with the logic unit 216 of the second basic module 204 acting as a "gateway". In one preferred embodiment, additional measures ensure that this "gateway" cannot corrupt the signals undetected.

For the current measurement, such a combination of the two basic modules 202, 204 has the advantage that one current sensor per basic module 202, 204 is sufficient. For ASIL B, each sensor 104, 214 is plausibilized individually, and for ASIL C or ASIL D, the current value from the second basic module 204 is used as a redundancy value.

For the voltage measurement, one exemplary embodiment likewise contains a reduced version in which not all cell voltages are transmitted from the first basic module 202 to the second basic module 204, but rather only the minimum and maximum values of the voltages (or of other measured values) are transmitted, for example via an additional chip in the sensor logic of the second basic module 204. These values are then monitored instead of complete redundancy as plausibility values via the redundant logic unit 106 of the first basic module 202.

Figure 3:
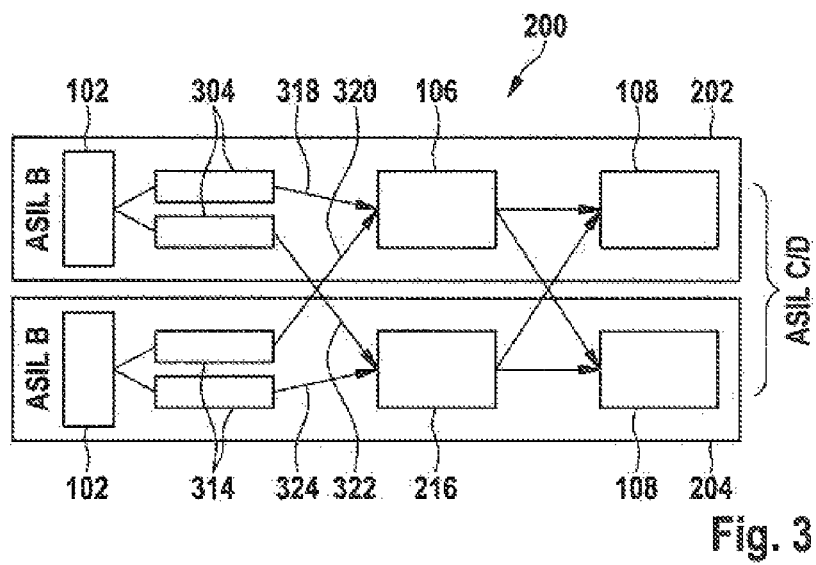
FIG. 3 shows an illustration of an exemplary combination of two ASIL-B modules having redundant sensor means to form an ASIL-C or ASIL-D module.

For the voltage and temperature measurement, an extended version would also be conceivable in which the sensor means 304, 314 (CSC=Cell Supervisor Circuit) is existent on a redundant basis, as reproduced in FIG. 3. In this exemplary embodiment, a signal path 318, 320, 322, 324 from each of the first basic module 202 and the second basic module 204 is evaluated.

The signals are evaluated by means of redundant logic units 106, 216. Hence, a high ASIL is possible for the safety functions, for example when monitoring the threshold values being exceeded.

Figure 4:
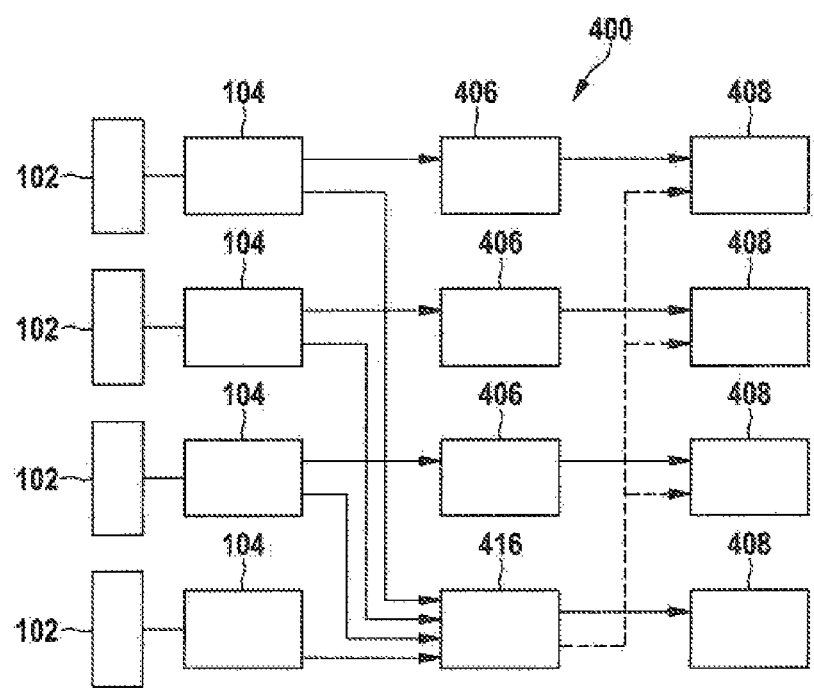
FIG. 4 shows a safety architecture implemented as a master-slave architecture.

In principle, a master/slave architecture 400 is conceivable for this in which one of n logic units operates as master 416, which performs the redundant evaluation of the sensor signals from at least some, but preferably from all other, slaves 406 (cf. FIG. 4). At least the logic unit operating as master 416 may be a controller.

In this exemplary embodiment, shutdown takes place directly by means of one or more actuators 408 or additionally by means of a shutdown request to the slaves 406 via a connecting communication bus.

In order to assure a high ASIL for the actuator means (shutdown via main contactors), the latter needs to be of sufficiently redundant design and/or the functionality thereof needs to be protected by means of diagnoses. This can be implemented by means of a shutdown path test, for example, as in the case of EGAS systems (EGAS=electronic gas pedal).

If the shutdown from the first basic module 202 can also control the actuator means (main contactors) of the second basic module 204, one preferred embodiment provides for the actuator means to be reduced to one main contactor per basic module 202, 204, depending on the failure rate of said actuator means. For ASIL B, one main contactor may be sufficient, which would result in a cost reduction. For ASIL C and D, two main contactors would then be available when two basic modules 202, 204 are combined, however, which ensures redundancies.

The embodiment of the disclosure is not limited to the preferred exemplary embodiments indicated above. Instead, a number of variants are conceivable that make use of the safety architecture according to the disclosure, the battery according to the disclosure and the motor vehicle according to the disclosure even in the case of fundamentally different kinds of embodiments.

The invention claimed is:

1. A battery system comprising:
   a plurality of battery modules, each battery module comprising:
   a battery including at least one electrochemical cell;
   at least one sensor configured to monitor the battery and monitor another battery in at least one other battery module in the plurality of battery modules to enable redundant monitoring of each battery in each battery module in the plurality of battery modules; and
   a data processing unit operatively connected to the at least one sensor and configured to process signals received from the at least one sensor and the at least one other sensor in the at least one other battery module in the plurality of battery modules each battery module further comprising: a shutdown path, the shutdown path being configured to receive an activation signal from the data processing unit in the at least one other battery module in the plurality of battery modules;
   the at least one sensor in each battery module further comprising a current sensor; and
   at least one data processing unit in one battery module in the plurality of battery modules being configured to:
   receive sensor data corresponding to an electrical current through the plurality of battery modules from the current sensor in at least two battery modules in the plurality of battery modules; and
   activate the shutdown path in response to first sensor data for the electrical current from a first current sensor in a first one of the plurality of battery modules being different from second sensor data for the electrical current from a second current sensor in a second one of the plurality of battery modules.

2. The system of claim 1, the shutdown path in each battery module in the plurality of battery modules further comprising:
   an actuator mechanism configured to receive the activation signal to disconnect the plurality of battery modules from at least one data processing unit in another battery module in the plurality of battery modules to enable disconnection of the plurality of battery modules using the actuator mechanism in any battery module in the plurality of battery modules.

3. A motor vehicle, comprising:
   an electric drive motor configured to drive the motor vehicle; and
   a battery system connected to the electric drive motor, the battery system comprising:
   a plurality of battery modules, each battery module comprising:
   a battery including at least one electrochemical cell;
   at least one sensor configured to monitor the battery and monitor another battery in at least one other battery module in the plurality of battery modules to enable redundant monitoring of each battery in each battery module in the plurality of battery modules; and
   a data processing unit operatively connected to the at least one sensor and configured to process signals received from the at least one sensor and the at least one other sensor in the at least one other battery module in the plurality of battery modules
   each battery module further comprising: a shutdown path, the shutdown path being configured to receive an activation signal from the data processing unit in the at least one other battery module in the plurality of battery modules;
   the at least one sensor in each battery module further comprising a current sensor; and
   at least one data processing unit in one battery module in the plurality of battery modules being configured to:
   receive sensor data corresponding to an electrical current through the plurality of battery modules from the current sensor in at least two battery modules in the plurality of battery modules; and
   activate the shutdown path in response to first sensor data for the electrical current from a first current sensor in a first one of the plurality of battery modules being different from second sensor data for the electrical current from a second current sensor in a second one of the plurality of battery modules.

* * * * *